(12) United States Patent
Luo

(10) Patent No.: US 7,042,439 B2
(45) Date of Patent: May 9, 2006

(54) METHOD AND APPARATUS FOR DETERMINING RELATIVE MOVEMENT IN AN OPTICAL MOUSE

(75) Inventor: Xiaodong Luo, Sunnyvale, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 549 days.

(21) Appl. No.: 10/011,593

(22) Filed: Nov. 6, 2001

(65) Prior Publication Data

US 2003/0085878 A1    May 8, 2003

(51) Int. Cl.
*G09G 5/08*    (2006.01)
(52) U.S. Cl. ................ 345/157; 345/175; 345/166
(58) Field of Classification Search ........ 345/157, 345/158, 163, 166, 175; 382/107, 251
See application file for complete search history.

(56) References Cited

U.S. PATENT DOCUMENTS

| | | | | |
|---|---|---|---|---|
| 5,557,341 A | * | 9/1996 | Weiss et al. | 348/699 |
| 5,644,139 A | | 7/1997 | Allen et al. | |
| 5,731,849 A | * | 3/1998 | Kondo et al. | 348/699 |
| 5,786,804 A | | 7/1998 | Gordon | |
| 5,905,527 A | * | 5/1999 | Inou et al. | 348/207.99 |
| 6,014,181 A | * | 1/2000 | Sun | 348/699 |
| 6,160,900 A | * | 12/2000 | Miyawaki et al. | 382/107 |
| 6,256,016 B1 | | 7/2001 | Piot et al. | |
| 6,259,737 B1 | * | 7/2001 | Fung et al. | 375/240.16 |
| 6,281,882 B1 | | 8/2001 | Gordon et al. | |
| 6,366,317 B1 | * | 4/2002 | Mattison et al. | 348/241 |
| 6,411,278 B1 | * | 6/2002 | Kage et al. | 345/158 |
| 6,510,193 B1 | * | 1/2003 | Kochi et al. | 377/60 |
| 6,584,212 B1 | * | 6/2003 | Park et al. | 382/107 |
| 6,718,064 B1 | * | 4/2004 | Abe | 382/232 |

* cited by examiner

*Primary Examiner*—Amr A. Awad
*Assistant Examiner*—Leonid Shapiro
(74) *Attorney, Agent, or Firm*—Perkins Coie LLP

(57) ABSTRACT

A method of determining a movement vector between two images is disclosed. The two images are sequentially taken by an optical mouse. The method comprises first calculating a directional correlation value for a plurality of directional shifts between the first image and the second image. The minimum directional correlation value is chosen and compared to a threshold value. If the minimum directional correlation value calculated is less than the threshold, identifying a movement vector associated with the minimum directional correlation value. However, if the minimum directional correlation value is not less than the threshold, the first and second images are compressed and the calculations are redone. The compression continues until a qualifying movement vector is identified.

17 Claims, 4 Drawing Sheets

| 5 | 7 | 0 | 11 | 53 | 3 |
|---|---|---|---|---|---|
| 15 | 77 | 63 | 13 | 1 | 88 |
| 29 | 54 | 99 | 80 | 70 | 27 |
| 0 | 3 | 91 | 8 | 53 | 72 |
| 17 | 29 | 2 | 86 | 93 | 39 |
| 18 | 42 | 28 | 31 | 58 | 92 |

401

| 5  | 7  | 0  | 11 | 53 | 3  |
|----|----|----|----|----|----|
| 15 | 77 | 63 | 13 | 1  | 88 |
| 29 | 54 | 99 | 80 | 70 | 27 |
| 0  | 3  | 91 | 8  | 53 | 72 |
| 17 | 29 | 2  | 86 | 93 | 39 |
| 18 | 42 | 28 | 31 | 58 | 92 |

|  |  |  |  |  |  |
|---|---|---|---|---|---|
| 26 | 21.7 | 38.7 |  |  |  |
| 21.5 | 69.5 | 55.5 |  |  |  |
| 26.5 | 36.7 | 65.5 |  |  |  |
|  |  |  |  |  |  |
|  |  |  |  |  |  |
|  |  |  |  |  |  |

FIGURE 4

METHOD AND APPARATUS FOR DETERMINING RELATIVE MOVEMENT IN AN OPTICAL MOUSE

TECHNICAL FIELD OF THE INVENTION

The present invention relates generally to optical mice, and more particularly, to a method for determining fast movement of an optical mouse with reduced calculation requirements.

BACKGROUND OF THE INVENTION

Various types of pointing devices are used as input devices that allow a user to manipulate a cursor of a computer. In laptop computers, a capacitive touch pad is commonly used to manipulate the cursor. For desktop computers, the ubiquitous computer mouse constitutes the large majority of pointing devices. The mouse allows for cursor manipulation on a visual display screen of a personal computer or workstation, for example. Cursor manipulation includes actions such as rapid relocation of a cursor from one area of the display screen to another area or selecting an object on a display screen.

In a prior art "roller ball" mouse, a user controls the cursor by moving the mouse over a surface, such as a mouse pad, so that the cursor moves on the display screen in a direction and a distance that is proportional to the movement of the mouse. The roller ball mouse, however, has drawbacks associated with many other devices that have mechanical parts. Namely, over time the mechanical components wear out, become dirty, or simply break down so that the cursor can no longer be accurately manipulated, if at all.

Recently, "optical" mice that use image sensors have been developed. For example, U.S. Pat. No. 6,281,882 describes an optical mouse that produces a collimated beam of light that illuminates a surface upon which the mouse rests. A sensor array portion of an image sensor receives the reflected images of the surface as the mouse is traversed across a surface. The changes in successive reflected images are then determined to be mouse movement, which is then interpreted as a desired cursor movement.

The '882 patent provides an excellent primer on optical mouse technology, detailing the physical construction of an optical mouse, the generation of interrogating light, the optical lens system for capturing the reflected light to form image frames, and the methods by which movement is determined. The present invention is concerned with the method by a "movement vector" is determined from the image frames. The term movement vector as used herein describes the magnitude and direction of the movement of the mouse. The movement vector, when provided to an associated computing device, can then be used to manipulate a cursor.

The '882 patent refers to several prior related patents, including U.S. Pat. Nos. 5,578,813, 5,644,139, and 5,786,804, which detail various methods the movement vector can be determined. In general, consecutive image frames are compared to one another to determine the relative motion of the mouse. The sensor array produces a two-dimensional image of the surface, the image being formed from discrete pixels. In the method described in the '139 patent, a first frame is stored. A second subsequent frame is then captured and stored. The second frame is compared to the first frame to determine the movement vector. Specifically, a correlation value is determined for each possible shift of the subsequent frame in the direction of each immediately neighboring pixel. For two-dimensional arrays, this corresponds to eight correlation calculations. Further, a correlation calculation is performed accounting for no shifting of the subsequent image. Thus, nine total correlation calculations are performed, relative to the first frame. The shift that results in the highest correlation provides the movement vector. Further detail on this technique can be found in the '139 patent.

However, because the correlation calculation is performed with a single pixel shift in each direction, the maximum speed by which the optical mouse can be moved (while still providing a usable signal) is limited. Specifically, the optical mouse cannot be translated more than one pixel distance between successively captured images without significant increase in the amount of correlation calculations. Thus, if the optical mouse is translated between one to two pixels between successive images, then 25 correlation calculations must be performed. If the optical mouse is translated between two to three pixels between successive images, 49 correlation calculations must be performed.

BRIEF DESCRIPTION OF THE DRAWINGS

In the drawings, like reference numerals refer to like parts throughout the various views of the non-limiting and non-exhaustive embodiments of the present invention, and wherein:

FIG. 3 is a schematic illustration of a sensor array comprised of individual pixels arranged in a two-dimensional array.

FIG. 4 is a schematic illustration of the sensor array of FIG. 3 grouped according to a block size of 2×2.

DETAILED DESCRIPTION OF THE ILLUSTRATED EMBODIMENTS

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
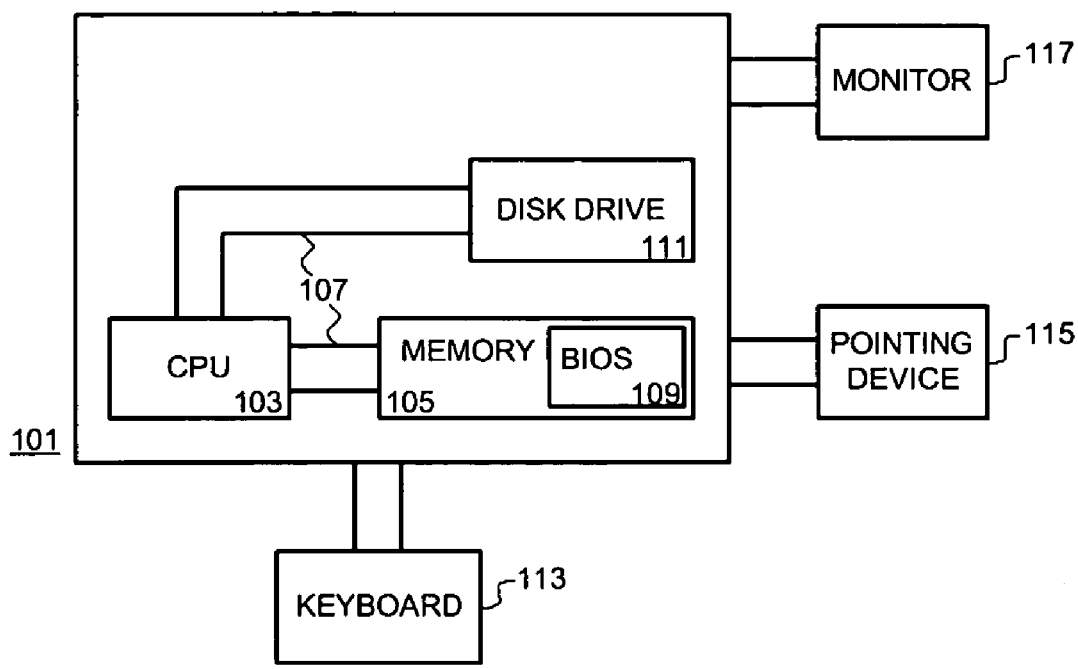
FIG. 1 is a schematic diagram of a prior art personal computer that incorporates a pointing device.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like.

With reference to FIG. 1, an exemplary environment for the invention includes a general purpose computing device in the form of a conventional personal computer 101, which includes a processing unit 103, a system memory 105, and a system bus 107 that couples various system components including the system memory 105 to the processing unit 103. The system bus 107 may be any of several types of bus structures including a memory bus or memory controller, a peripheral bus, and a local bus using any of a variety of bus architectures. The system memory 105 may include read only memory (ROM), flash memory, or random access memory (RAM). A basic input/output 109 (BIOS), containing the basic routine that helps to transfer information between elements within the personal computer 101, such as during start-up, is stored in memory 105.

The personal computer 101 further includes a disk drive 111, such as a floppy disk drive or a CD disk drive. The disk drive 111 is connected to the system bus 107. The disk drive 111 and the associated computer-readable media provide nonvolatile storage of computer readable instructions, data structures, program modules and other data for the personal computer 101.

Although the exemplary environment described herein employs a disk drive 111, it should be appreciated by those skilled in the art that other types of computer readable media which can store data that is accessible by a computer, such as magnetic cassettes, flash memory cards, digital video disks, and the like, may also be used in the exemplary operating environment.

A number of program modules may be stored on the memory 105, including an operating system, one or more application programs, other program modules, and program data. A user may enter commands and information into the personal computer 101 through input devices such as a keyboard 113 and optical mouse 115. These and other input devices are often connected to the processing unit 103 through a serial port interface that is coupled to the system bus 107. A monitor 117 or other type of display device is also connected to the system bus 107 via an interface, such as a video adapter.

The personal computer 101 may operate in a networked environment using logic connections to one or more remote computers. The remote computer may be another personal computer, a server, a router, a network PC, a peer device or other network node, and typically includes many or all of the elements described above relative to the personal computer 101. Such networking environments are commonplace in offices, enterprise-wide computer network intranets and the Internet.

The optical mouse 115 may be substantially similar to that described in the '882 patent or U.S. Pat. Nos. 6,256,016 or 6,172,354. Indeed, the method and apparatus of the present invention (as implemented by an integrated circuit) may be incorporated into the structures found in the above patents. The distinction of the present invention over the prior art is the method by which the movement vector is determined. Whereas in the '139 patent, the movement vector is determined by shifting a subsequent frame in various directions and calculating a correlation (of every pixel in the image) to a previous frame and then determining the direction with highest correlation, as will be seen in greater detail below, the present invention progresses through stages of block matching.

Figure 2:
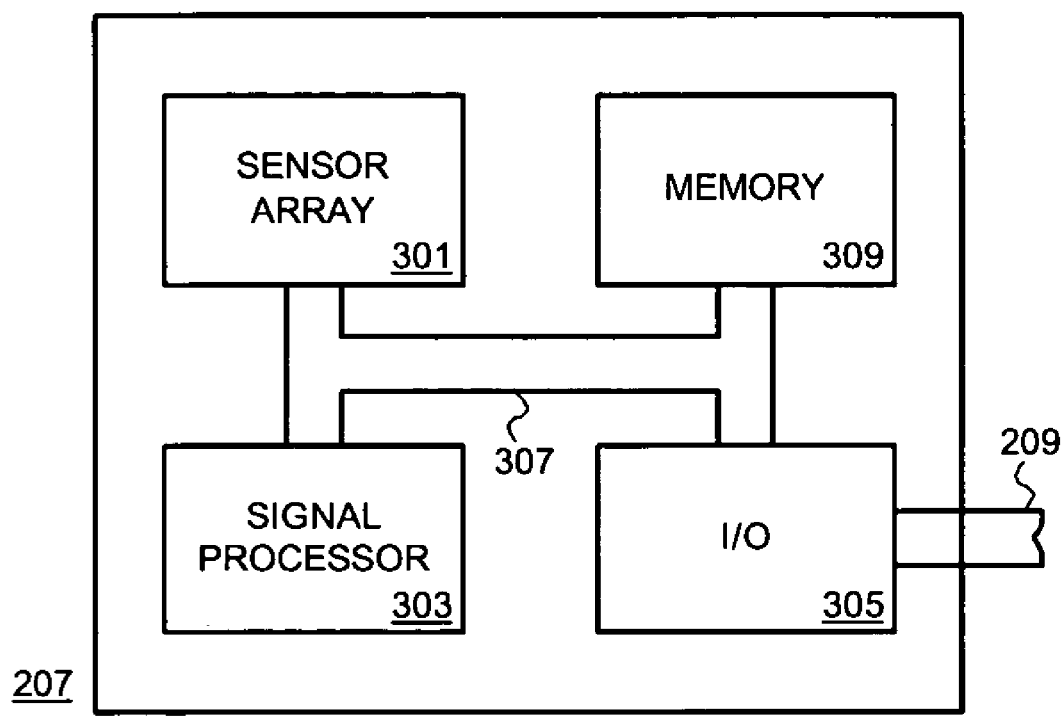
FIG. 2 is a schematic illustration of an integrated circuit suitable for use with the optical mouse of FIG. 1.

Turning to FIG. 2, an integrated circuit 207 formed in accordance with the present invention includes a sensor array 301, a signal processor 303, an input/output (I/O) 305, memory 309, and bus 307. The I/O 305 is connected via a cable 209 to the computer 101. Preferably, each of these components is formed on a single silicon substrate and manufactured to be integrated onto a single chip using standard CMOS processes.

The sensor array 301 may be, for example, substantially similar to the sensor arrays portions of image sensors manufactured by the assignee of the present invention, OmniVision Technologies, Inc., of Sunnyvale, Calif., as model numbers OV7630, OV7920, OV7930, OV9620, OV9630, OV6910, or OV 7640. However, typically the sensor array 301 of the present invention has a much lower resolution than model numbers above. Thus, instead of hundreds of thousands of pixels, the sensor array 301 may only include several hundred or a few thousand pixels. For example the sensor array 301 may be a 20×20 array.

Thus, the sensor array 301 includes a plurality of individual pixels arranged in a two-dimensional array. In operation, as the optical mouse is pointed at any arbitrary image, the image is focused onto the sensor array 301 by a lens system such that the sensor array 301 can obtain the raw image data.

The raw image data is then received by the signal processor 303 via bus 307 to begin signal processing. The signal processor 303 is capable of executing a set of preprogrammed instructions (perhaps stored in memory 309) necessary to carry out the functions of optical mouse. The design of the signal processor 303 may be obtained from any number of companies that provide embedded microprocessor or DSP cores, as applicable.

In the context of the presently illustrated embodiments, the signal processor 303 is programmed to obtain raw image data and store it with memory 309. In particular, in operation, the signal processor 303 stores a first image into memory 309. A second subsequent image is then also stored in memory 309. As further images are received, the images are stored in memory 309 in a first in first out (FIFO) fashion. The memory 309 should be large enough to store at least two successive images. In one embodiment, the sensor array may operate at a speed of 1500 frames per second, although slower or faster rates may be equally usable. Thus, two successive images are separated in time by 0.67 milliseconds.

Once two successive images have been collected, the method of the present invention may be implemented by the signal processor (in conjunction with the memory 309) to determine a movement vector between the two images.

Thus, the signal processor 303, which may be a microprocessor or a digital signal processor ("DSP"), is used to calculate movement of the optical mouse 115 based upon successive images captured by the sensor array 301. Once the movement has been calculated, the signal processor 303 provides X and Y movement coordinates to I/O 305 (referred to as a movement vector), which in turn provides the coordinates to computer 101. This information is then provided to the computer 101 via the I/O 305. The computer 101 can then utilize this information to manipulate a cursor on the monitor 117. In this manner, the optical mouse 115 of the present invention may be used to control a cursor.

Turning to FIG. 3, an exemplar 12×12 raw image 401 is shown. Each pixel in the raw image 401 has an associated signal magnitude. Exemplar signal magnitudes are provided for each pixel for a portion of the raw image 401.

As noted above, the present invention uses a block average match method to minimize the amount of calculations necessary by the processor 303 in order to calculate the movement vector. The block matching method uses an adjustable block size. Suppose the raw image data has dimensions M (horizontal)×N (vertical). In the case of the raw image shown in FIG. 3, M=12 and N=12.

For the first frame, the raw image data can be mathematically denoted as $F_S(x, y)$, where S is an integer that denotes the block size, and x varies from 1 to M (1T x T M) and y varies from 1 to N(1T y T N).

Similarly, for the second frame, the raw image data can be mathematically denoted as $C_S(x, y)$, where S is an integer that denotes the block size, and x varies from 1 to M (1T x T M) and y varies from 1 to N (1T y T N).

As will be seen in greater detail below, in accordance with the present invention, the block size S starts with 1 and increments by one (to a limit of N or M) until a successful match is found.

If the block size S is increased to 2, then the resulting data array has a dimension of M/2 x N/2. For the first frame, the raw image data can be mathematically denoted as $F_2(x, y)$, where x varies from 1 to M/2 (1T x T M/2) and y varies from 1 to N/2 (1T y T N/2). Similarly, for the second frame, the raw image data can be mathematically denoted as $C_2(x, y)$, where x varies from 1 to M/2 (1T x T M/2) and y varies from 1 to N/2 (1T y T N/2).

Figure 4:
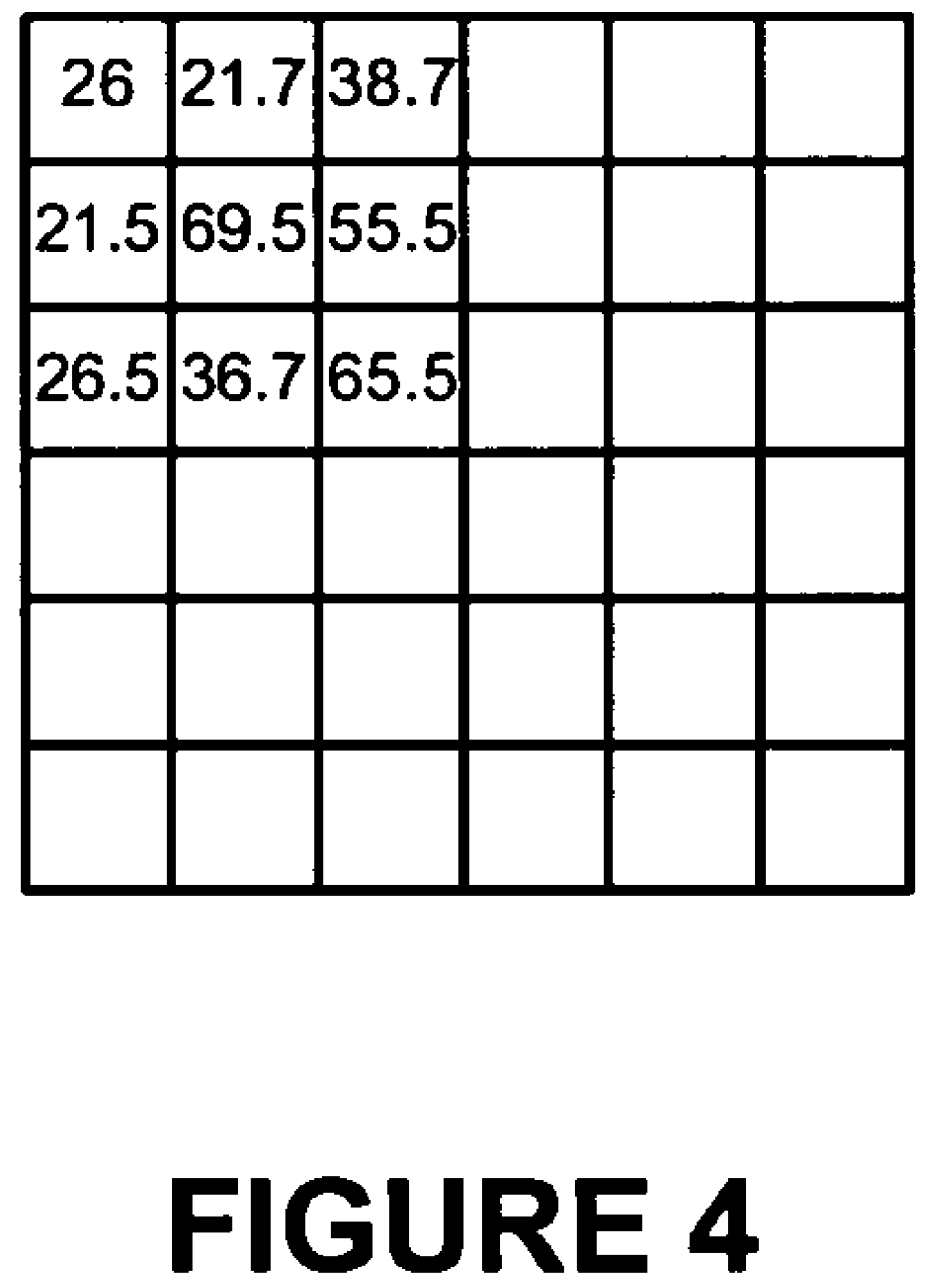

Each block of 2×2 of the raw image of FIG. 3 are then averaged to form a smaller pixel matrix that is 6×6. FIG. 4 shows such an averaged pixel matrix where the block size is 2×2. Portions of the matrix are filled in using the same data from FIG. 3.

If the block size S is increased to 4, then the resulting data array has a dimension of M/4 x N/4. For the first frame, the raw image data can be mathematically denoted as $F_4(x, y)$, where x varies from 1 to M/4 (1T x T M/4) and y varies from 1 to N/4 (1T y T N/4). Similarly, for the second frame, the raw image data can be mathematically denoted as $C_4(x, y)$, where x varies from 1 to M/4 (1T x T M/4) and y varies from 1 to N/4 (1T y T N/4).

In general, the method of the present invention is useful for determining rapid movement of a mouse without large numbers of calculations, particularly movement that is greater than one pixel distance. In particular, a movement vector calculation is performed with a block size S of 1.

In one embodiment, a movement vector is determined after performing a correlation calculation between the two sequential frames of pixel data for each possible direction shift. Typically, there are nine possible direction shifts: left, right, top, bottom, upper right, upper left, lower right, lower left, and no shift. In one embodiment, the correlation calculation is based upon a simple subtraction of signal magnitudes for pixels in the two frames that are compared. The total of the difference in signal magnitudes for each pixel is then obtained for each directional shift. Thus, for each set of two sequential frames, nine correlation calculations are determined.

Specifically, the following describes how the correlation calculations (referred to as a frame difference sum "FDS") are performed in one embodiment of the present invention. In general, as seen in the pseudocode below, a correlation calculation (also referred to as a "sum") for each of nine directions (denoted as S(d), where d is between 0–8) is obtained. The sum is the absolute value of the difference between pixels in the first frame F and the second frame C. However, the pixels that are subtracted are shifted in various directions (or not shifted at all for Sum(4)).

After all of the sums are calculated, a determination is made as to which sum is the smallest. Next, the smallest sum (MinimumSum) is checked against a threshold value. The smallest sum, or smallest correlation calculation value, then provides a direction of movement (the movement vector).

Further, in accordance with the present invention, only if the MinimumSum is less than a threshold value is the movement vector determined as valid and output. If the MinimumSum is not less than the threshold value, then the correlation calculation leading to the movement vector is deemed to have failed. At this point, as detailed below, the raw image data is compressed by averaging S×S blocks of data to form a more compressed matrix as shown in FIG. 4. The same correlation calculations are performed on this compressed matrix. This process continues until the MinimumSum is below the threshold. Note that the threshold value should be lowered to compensate for the fewer number of pixels. As one example, for a 2×2 block average, the threshold value may be divided by 4.

```
/*Nine-direction absolute magnitude frame difference sum and get the minimum FDS*/
FDS()
{
initial Sum(n)
for (x = 2; x < M; x++)
{for (y=2; y<N; y++)
    {   Sum(0) = Sum(0) + |C(x, y) − F(x−1,y−1)|; // move to upper left
        Sum(1) = Sum(1) + |C(x,y) − F(x,y−1)|; // move to upper
        Sum(2) = Sum(2) + |C(x,y) − F(x+1, y−1)|; // move to upper right
        Sum(3) = Sum(3) + |C(x,y) − F(x−1,y)|; // move to left
        Sum(4) = Sum(4) + |C(x,y) − F(x,y)|; // no move
        Sum(5) = Sum(5) + |C(x,y) − F(x+1,y)|; // move to right
        Sum(6) = Sum(6) + |C(x,y) − F(x−1,y+1)|; // move to lower left
        Sum(7) = Sum(7) + |C(x,y) − F(x,y+1)|; // move to lower
        Sum(8) = Sum(8) + |C(x,y) − F(x+1, y+1)|; // move to lower right
    }
}
(I, Minimum) = getMinimumSum(Sum); // get the minimum sum and movement index
```

```
-continued

If MinimumSum < Threshold
    return(i);        // i is 0 - 8; indicate move vector
else
    return(failed);
}
```

Thus, if a correlation calculation on a block size S yields an invalid result, then the block size S is incremented (using one of a variety of possible incrementing strategies) until a valid correlation calculation is obtained. Once the acceptable correlation calculation value is identified, then the movement vector can be determined, the magnitude of the movement vector dependent upon the block size S that yields the acceptable correlation calculation value.

The following is a pseudocode implementation of this general method described above. Note that FDS is the correlation calculation value.

```
GetCurrentFrame(C1);
if FDS(C1, F1, M, N) = failed then
    if FDS(C2, F2, M/2, N/2) = failed then
        if FDS(C4, F4, M/4, N/4) = failed then
            ....
        Else
            Report movement vector-4   //movement at 4x speed
            Update F1 = C1
        endif
    else
        Report movement vector-2   //movement at 2x speed
        Update F1 = C1
    endif
else
    Report movement vector-1   //movement at 1x speed
    Update F1 = C1;
endif
```

It has been found that the foregoing method is advantageous for fast movement of the mouse. The number of calculations to be performed is lower than that of any known prior art.

While the invention is described and illustrated here in the context of a limited number of embodiments, the invention may be embodied in many forms without departing from the spirit of the essential characteristics of the invention. The illustrated and described embodiments are therefore to be considered in all respects as illustrative and not restrictive. For example, in the above disclosure, the correlation calculation is a simple absolute value of the difference between signal magnitudes of pixels. In other embodiments, the correlation calculation may be any one of a number of mathematical measures of the difference between sequential frames. Further, while the pixel blocks are compressed by taking an average of pixels, other mathematical methods may be used to compress the raw image data into a more compressed version.

Thus, while the present invention has been described as useful in the optical mouse application, the present invention can be utilized in many different applications, including but not limited to, machine vision. The scope of the invention is indicated by the appended claims rather than by the foregoing description, and all changes which come within the meaning and range of equivalency of the claims are intended to be embraced therein.

What is claimed is:

1. A method of determining a movement vector between two digital images comprising:
   (a) capturing a first MxN dimensional image and a second MxN dimensional image, wherein each image comprises MxN data values and M and N are greater than 2;
   (b) calculating a directional correlation value for a plurality of directional shifts between said first image and said second image;
   (c) identifying a minimum directional correlation value from said directional correlation values;
   (d) determining if the minimum directional correlation value calculated is less than a predetermined threshold, and
      (i) if so, identifying a movement vector associated with said minimum directional correlation value, and
      (ii) if not, compressing said first image and said second image into (M/S)x(N/S) dimensional images comprising (M/S)x(N/S) data values, wherein S is an integer greater than 1, and wherein the value of each data point of a compressed image is an average of SxS data values of the original image which the compressed data point is replacing, such that said first image and said second image have a smaller dimension and repeating (b) through (d) with incremented S until said movement vector is identified, wherein M and N are even multiples of S.

2. The method of claim 1 wherein said first image and second image are captured by an image sensor incorporated into an optical mouse.

3. The method of claim 1 wherein said second image is captured after said first image is captured.

4. The method of claim 1 wherein S is incremented as further compression is performed.

5. The method of claim 1 wherein said directional correlation value is the sum of the absolute values of the differences between the pixels of said first image and second image.

6. The method of claim 1 wherein said movement vector has a direction and a magnitude and further wherein said magnitude of said movement vector is proportional to the level of compression performed on said first image and said second image.

7. The method of claim 6 wherein said magnitude is dependent upon S.

8. An optical mouse that outputs a movement vector having a magnitude and direction, the movement vector indicative of the relative movement of the optical mouse, the optical mouse comprising:
   a sensor array for capturing a first image and a second image;
   memory for storing said first image and said second image; and
   a signal processor operative to:

(a) calculate a directional correlation value for a plurality of directional shifts between said first image and said second image;
(b) identify a minimum directional correlation value from said directional correlation values;
(c) determine if the minimum directional correlation value calculated is less than a predetermined threshold, and
  (i) if so, identifying a movement vector associated with said minimum directional correlation value, and
  (ii) if not, compressing said first image and said second image such that said first image and said second image have a smaller dimension by:
    partitioning said image into a plurality of blocks of pixels each having a dimension S×S, S being an integer greater than 1;
    averaging each of said plurality of blocks of pixels into one compressed pixel; and
    forming a compressed image from the collection of said one compressed pixel taken from each of said plurality of blocks of pixels, wherein said first image and said second image contain a number of pixels, the number being an even multiple of S; and
    repeating (a) through (c) with incremented S until said movement vector is identified.

9. The optical mouse of claim 8 wherein the dimension S is an integer and is incremented as further compression is performed.

10. The optical mouse of claim 8 wherein said directional correlation value is the sum of the absolute values of the differences between the pixels of said first image and second image.

11. The optical mouse of claim 9 wherein said magnitude of said movement vector is proportional to the level of compression performed on said first image and said second image.

12. The optical mouse of claim 11 wherein said magnitude is dependent upon the dimension S.

13. An integrated circuit that outputs a movement vector having a magnitude and direction, the movement vector indicative of the relative movement of the optical mouse, the optical mouse comprising:
a sensor array formed on a substrate for capturing a first image and a second image;
memory formed on said substrate for storing said first image and said second image; and
a signal processor formed on said substrate operative to:
(a) calculate a directional correlation value for a plurality of directional shifts between said first image and said second image;
(b) identify a minimum directional correlation value from said directional correlation values;
(c) determine if the minimum directional correlation value calculated is less than a predetermined threshold, and
  (i) if so, identifying a movement vector associated with said minimum directional correlation value, and
  (ii) if not, compressing said first image and said second image such that said first image and said second image have a smaller dimension, wherein said compressing is
    accomplished by: partitioning said image into a plurality of blocks of pixels each having a dimension S×S, S being an integer greater than 1;
    averaging each of said plurality of blocks of pixels into one compressed pixel; and
    forming a compressed image from the collection of said one compressed pixel taken from each of said plurality of blocks of pixels, wherein said first image and said second image contain a number of pixels, the number being an even multiple of S; and
    repeating (a) through (c) with incremented S until said movement vector is identified.

14. The integrated circuit of claim 13 wherein the dimension S is an integer and is incremented as further compression is performed.

15. The integrated circuit of claim 13 wherein said directional correlation value is the sum of the absolute values of the differences between the pixels of said first image and second image.

16. The integrated circuit of claim 14 wherein said magnitude of said movement vector is proportional to the level of compression performed on said first image and said second image.

17. The integrated circuit of claim 16 wherein said magnitude is dependent upon the dimension S.

* * * * *

UNITED STATES PATENT AND TRADEMARK OFFICE
CERTIFICATE OF CORRECTION

| | | |
|---|---|---|
| PATENT NO. | : 7,042,439 B2 | Page 1 of 1 |
| APPLICATION NO. | : 10/011593 | |
| DATED | : May 9, 2006 | |
| INVENTOR(S) | : Xiaodong Luo | |

It is certified that error appears in the above-identified patent and that said Letters Patent is hereby corrected as shown below:

Title Page
References Cited, per Examiner's Notice of References Cited mailed July 7, 2004, please insert the following reference: US2002/0039386  04-2002        Han et al.

Signed and Sealed this

Fifth day of September, 2006

JON W. DUDAS
*Director of the United States Patent and Trademark Office*